United States Patent [19]

Mueller

[11] Patent Number: 4,481,583
[45] Date of Patent: Nov. 6, 1984

[54] METHOD FOR DISTRIBUTING RESOURCES IN A TIME-SHARED SYSTEM

[75] Inventor: Mark W. Mueller, Morganville, N.J.

[73] Assignee: AT&T Bell Laboratories, Murray Hill, N.J.

[21] Appl. No.: 316,878

[22] Filed: Oct. 30, 1981

[51] Int. Cl.³ .............................................. G06F 9/46
[52] U.S. Cl. ..................................... 364/300; 364/200
[58] Field of Search ... 364/200 MS File, 900 MS File

[56] References Cited

U.S. PATENT DOCUMENTS

| | | | |
|---|---|---|---|
| 3,573,856 | 4/1971 | Best et al. | 364/200 |
| 3,676,860 | 7/1972 | Collier et al. | 364/200 |
| 3,925,766 | 12/1975 | Bardotti et al. | 364/200 |
| 4,001,784 | 1/1977 | Bardotti | 364/200 |
| 4,030,075 | 6/1977 | Barlow | 364/200 |
| 4,096,571 | 6/1978 | VanderMey | 364/200 |
| 4,161,779 | 7/1979 | Spencer et al. | 364/200 |
| 4,183,083 | 1/1980 | Chatfield | 364/200 |
| 4,208,714 | 6/1980 | Eklund et al. | 364/200 |
| 4,232,294 | 11/1980 | Burke | 364/200 |

OTHER PUBLICATIONS

Bell System Tech. Journal, vol. 57, No. 6, "UNIX Implementation", K. Thompson, Jul.-Aug. 1978, pp. 1931-1946.

Primary Examiner—Eddie P. Chan
Attorney, Agent, or Firm—M. A. Morra

[57] ABSTRACT

A method is disclosed for distributing processing resources among a plurality of users of a time-shared system wherein resources are divided among various user accounts; each user assigning specific weights to the various programs (processes) in his account. A program is selected for processing in accordance with its assigned weight, the resources allocated to the account containing the process, and its recent processing rate. Programs are executed through a series of processing intervals; after each interval the priority of the executing program is lowered in proportion to the resources consumed. Priorities are recalculated after each processing interval for all programs competing for access to the resources.

7 Claims, 3 Drawing Figures

METHOD FOR DISTRIBUTING RESOURCES IN A TIME-SHARED SYSTEM

TECHNICAL FIELD

This invention relates to the distribution of resources in a time-shared system and more particularly to a method for establishing priorities among resource users.

BACKGROUND OF THE INVENTION

There are basically two types of systems available to a user in need of processing resources, shared and dedicated systems, each having its own particular advantages. Shared systems offer the user low start-up cost and no support obligations. Dedicated systems offer the user a fixed size resource so he need not compete with a large user community in order to gain access to the processing resource. Neither system offers the advantages of the other.

A dedicated computing system has certain advantages that include user control over response time. A user may, for example, select a system "size" that assures a minimum response time for certain processes. Additionally, the user of a dedicated system may allocate resources to others in a manner that precludes interference with his own use. In general, user control over a processing environment is characterized by three features:

1. Insulation—The degree of independence from the effects of other users on the system.
2. Tunability—the ability to control the rate of execution of a particular process.
3. Predictability—the ability to estimate the response time of a particular process within a usefully narrow range.

In a time-shared computing system a number of priority schemes have arisen whereby a degree of control over the distribution of resources has been achieved. In one known technique priority is granted in accordance with the length of time a user has been waiting, vis-a-vis other users. In another known technique priority is granted to the user having the shortest anticipated run time.

In U.S. Pat. No. 4,096,571 issued to J. E. Vander Mey on June 20, 1978, there is disclosed a "System for Resolving Memory Access Conflicts Among Processors and Minimizing Processor Waiting Times for Access to Memory by Comparing Waiting Times and Breaking Ties by an Arbitrary Priority Ranking." This patent seeks to minimize the maximum processor's waiting time by precluding any processor from reaching the memory twice before another, that has in the meantime requested it, reaches it once.

In the time-shared environment individual programs, or user processes, are not normally run to completion before another user process is run. Each user process is completed through a series of steps or processing bursts. System processes are usually assigned a higher priority than any user process. In a time-shared system described in the Bell System Technical Journal, July-August 1978, Volume 57, Number 6, Part 2, Pages 1935-37, resources are distributed among individual users on a substantially equal basis. "User process priorities are assigned by an algorithm based on a recent ratio of the amount of compute time to real time consumed by the process. A process that has used a lot of compute time in the last real time unit is assigned a low user priority." Priority, therefore, varies in accordance with use thereby providing a desirable negative feedback effect.

From the system's point of view, the challenge is to distribute control to users while maintaining economic viability. One solution is to provide to the user a dedicated system. The larger the user's operation, the more this makes sense. Smaller users, however, will need the economic advantages of a shared system.

It is, therefore, an object of this invention to provide small users of a time-shared processing system with the advantages of a dedicated processing system.

It is another object of this invention to provide all users with a degree of control over such characteristics as insulation, tunability and predictability in the time-shared processing environment.

SUMMARY OF THE INVENTION

In accordance with the objects of the invention a method is disclosed for time-sharing resources among a plurality of accounts, each containing one or more processes competing for access to the resources. A selectable share of the resources is assigned to each account and distributed to the individual processes in accordance with relative weights assigned to the various processes. Recent resource consumption is measured for the competing processes and a priority is established based on assigned shares and weights (entitlement) as well as recent resource consumption.

In an illustrative embodiment of the invention, periodic measurements are made of entitlement and the recent rate at which resources have been consumed (recent processing rate). Processes are executed in a plurality of processing intervals. After each interval, priorities of the various competing processes are recalculated; the process having the highest value of priority is selected for execution during the next processing interval.

It is a feature of this invention that access to a processing resource is provided in discrete time intervals in a manner that approximates continuous service.

It is another feature of this invention that users may assign a particular share of processing resources to an account and thereby select a performance level within a usefully narrow range.

It is yet another feature of this invention that spare capacity of a processing resource is shared among accounts in proportion to entitlement and recent processing rate.

DETAILED DESCRIPTION

Throughout this specification certain terms are used with great frequency and are herein defined:

User Process-An executing program. It is associated with a user account. The terms "process" and "program" are used interchangeably. A user process may be in an "active" or a "waiting" state. Active processes are those processes that are presently competing for access to the processing resources. A process may be in the waiting state when, for example, it requires additional input before proceeding.

Resource Unit (RU)-A unit of overall resource consumption (including that used by system services). The number of RU's that a program uses is a combination of the individual resources (CPU-seconds, I/O's, etc.) used.

Processing Unit (PU)-A measure of the rate at which RU's are used and equal to one RU per second. Thus, executing programs consume RU's at a rate specified in terms of PU's. From the user's point of view a level of performance is bought by contracting for PU's, and RU's are paid for as they are used.

Processing resources are allowcated to user accounts from a pool of processing resources (e.g., a physical computer). This pool has associated with it a PU capability or capacity. The total number of allocable PU's cannot exceed the resource pool capability. However, depending on service demand and the level of reservation, it may be possible to "overbook" to some extent.

Figure 1:
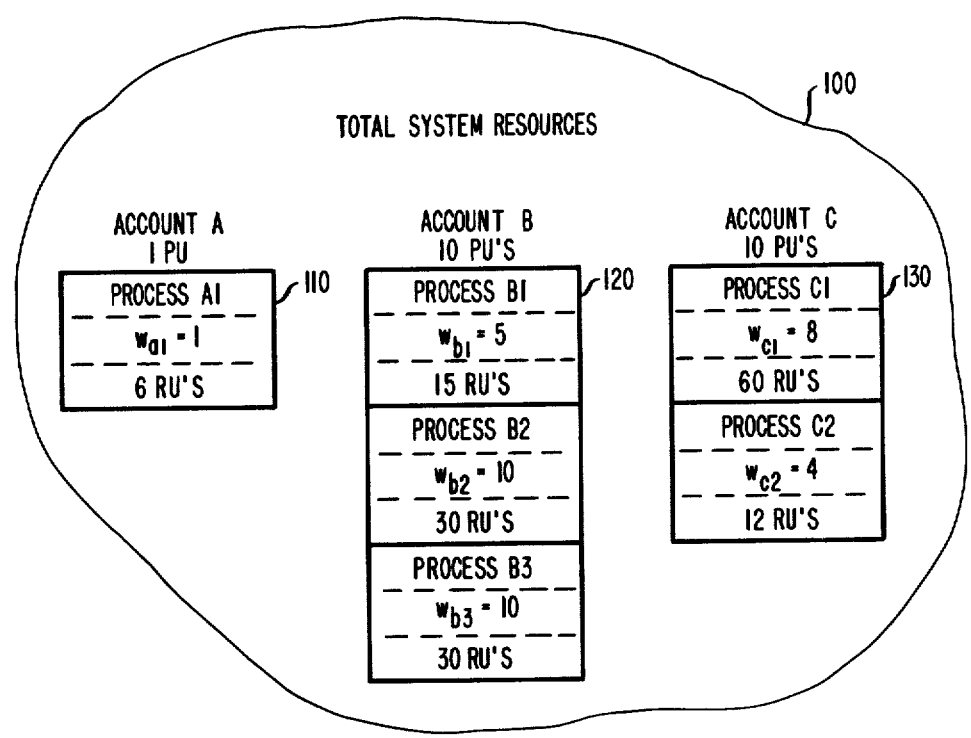
FIG. 1 illustrates a specific example of distributing computer resources among three user accounts.

FIG. 1 illustrates the allocation of computer system resources among three user accounts A, B, C. Each of the accounts has at least one program, or process, competing for execution. These are referred to as "active" processes. FIG. 1 broadly illustrates, with numerical detail, how resources are allocated and provides a simple introduction into a time-shared computing environment.

As shown in FIG. 1 relative weights (w) are assigned by the user to the various programs within an account. The processing resources of the account are divided among programs in the same way PU's divide the resources of the system among accounts. Within an account the rate at which the programs execute is proportional to the weight assigned to them. Weights give the user control over program execution and so address the aforementioned "tunability" objective. It is noted that only the relative value of the weights are meaningful. Furthermore, weights have significance only within an account.

A pool of processing resources provides PU's to user accounts A, B, C designated 110, 120, 130. User A has one program which has been found to typically consume 6 RU's. It has been decided that the objective response time is 6 seconds so 1 PU is needed for program A1. With only one program, user A need only contract for 1 PU for that account to achieve the objective response time. Program A1 is assigned a weight of 1. As discussed above, only the relative weights within a user account are meaningful; so, any number would lead to the same result.

User B has three programs, estimated to use 15 RU's, 30 RU's and 30 RU's. Run by themselves these programs would need 5 RU's, 10 PU's, and 10 PU's to achieve an objective response time of 3 seconds for each. Weights of 5, 10 and 10 are therefore assigned to programs B1, B2 and B3, respectively. User B plans to use these programs frequently but has only contracted for 10 PU's for this account. When user B tries to use all three programs at the same time the system divides the 10 PU's in the account among the three programs in the ratio of 5:10:10 as specified by the assigned weights. Their controlled rates of execution are now 2 PU's, 4 PU's, and 4 PU's. These sum to 10 PU's, the contracted level. If the system has spare capacity account B would receive a proportional share of it.

User C has two programs. According to measurements, C1 typically consumes 60 RU's and C2, 12 RU's. User C would like C1 to have a response time less than 7.5 seconds and C2 to have a response time under 3 seconds. So, 8 PU's and 4 PU's are needed for C1 and C2 respectively. User C plans to use C2 constantly and C1 fairly often. It is thus felt that a contract of 10 PU's for that account would be a good compromise between consistent high performance and low cost. When user C uses C1 and C2, concurrently, performance may be degraded since 12 PU's are needed to meet the objective response times. Programs C1 and C2 are assigned weights of 8 and 4; although, any assignment in the ratio of 2:1 would lead to the same result.

The terms used in FIG. 1 can be readily generalized to extend the overall concept to include an arbitrarily number of accounts and programs contained therein. Account i is said to contain $Q_i$ PU's. Thus, in terms of FIG. 1, Account B, $Q_b = 10$ PU's. Process j in account i has a weight of $w_{ij}$. Returning once again to FIG. 1, $w_{c2} = 4$.

Figure 2:
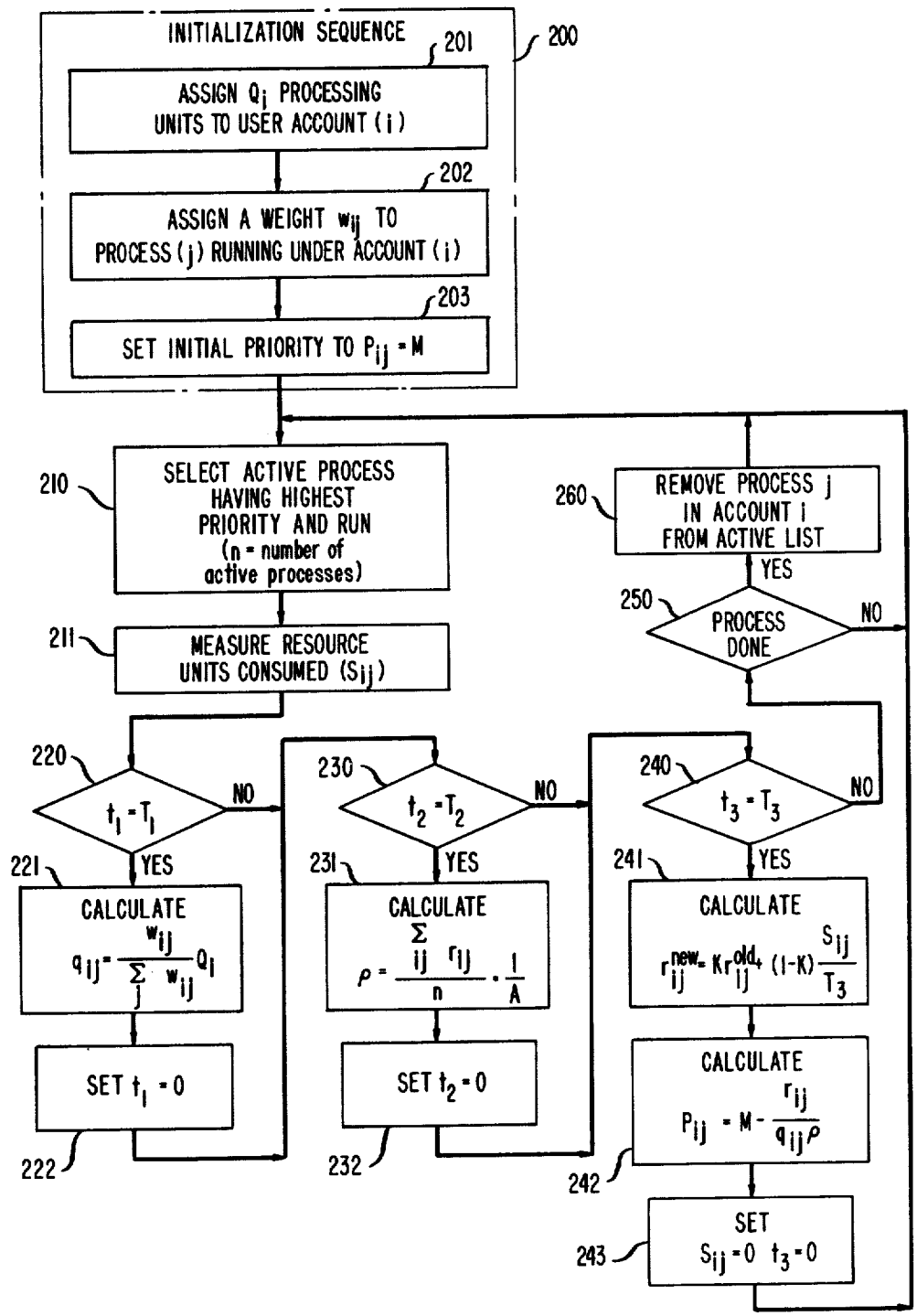
FIG. 2 discloses a flow diagram of a running process and the readjustment of its priority in acccordance with the invention.

FIG. 2 provides a more detailed description of the invention by means of a flow chart of a preferable embodiment. An initialization sequence (200) is described in three major blocks (201, 202, 203). Block 201 deals with the initial distribution of computer resources among users. These resources are called Processing Units (PU's) and are associated with particular user accounts. Account i, for example, is shown containing $Q_i$ PU's to be distributed among the active processes within that account. A particular process, say j, has a particular weight, $w_{ij}$, assigned to it. This weight may be supplied by the user and is shown in block 202.

Programs are all given a numerical priority and, for the purpose of the example, the values range from 0 to M where M is deemed to be the highest priority. As shown in block 203, the initial ($P_{ij}$) of process j running under account i is set equal to M, although any initial value would be acceptable. Process j in account i must now compete for processor time along with all other active processes. The activity indicated in Block 210 indicates a selection process, based on highest priority, among n active processes. Assuming that process j in account i is selected to run, the RU's used during execution are monitored and designated $S_{ij}$. It is appropriate to charge in accordance with use, so a running total of RU usage is maintained for each process. Different processing resources such as CPU time or Input/Output device time may have a different RU value than others. Therefore the RU consumption, during the same time interval, will vary according to the particular resource being used.

Three time clocks $t_1$, $t_2$, $t_3$ are shown in blocks 220, 230 and 240 to illustrate that periodically certain calculations are performed. These calculations ultimately lead to a reordering of priorities among programs. $T_1$, $T_2$ and $T_3$ are predetermined time intervals which represent the length of a period between the various calculations. Block 220 demonstrates that $q_{ij}$, an indication of entitlement, is measured every $T_1$ seconds for all active processes. Entitlement has the dimension of PU's and is a function of the normalized process weight and the number of PU's ($Q_i$) allocated to account i. An acceptable quantitative measure of entitlement is set forth in the following formula:

$$q_{ij} = \frac{w_{ij}}{\sum_j w_{ij}} \cdot Q_i.$$

Thus, $q_{ij}$ represents the number of PU's assigned to program j running under account i. Should this same program ever be transferred to another account, it would receive a different entitlement in accordance with the PU's allocated to that account and the relative weights of the other programs with which it must now compete. The normalized weight of program j is calculated by dividing it by the sum of all active program weights operating under the same account. Once the entitlement has been calculated, block 222 indicates that the $t_1$ clock is reset to zero.

Block 230 indicates that every $T_2$ seconds a calculation of priority scaling factor $\rho$ is made. The scaling factor is used to maintain the numerical values of all priorities at about the center of a predetermined range. The priority calculation itself is later discussed in connection with Block 242. Priority values can become very large or small depending upon the average running time of the programs. In order to avoid difficulties in comparing the numerical value of priorities at either end of the range, a scaling factor (whose magnitude varies with the average processing rate) is utilized.

Block 231 illustrates a computation of the average processing rate (RU's per second) for all n active processes. The following formula is an example of an acceptable algorithm for generating a scaling factor responsive to changes in the average processing rate:

$$\rho = \frac{\sum_{ij} r_{ij}}{n} \cdot \frac{1}{A}.$$

The constant "A" is a constant that governs the numerical range of priority values associated with the various processes. Reasonable values would range between 1 and M/2. $r_{ij}$ has the dimensions of RU's per second or PU's. Each active process has its own value of r which is a measure of its recent processing rate. Recall that programs are run in a series of discrete processing bursts. In order to maintain the appearance of a continuous processing environment, it is useful to monitor a smoothed measure of the recent processing rate for use in priority scheduling.

Block 232 indicates that $t_2$ is reset to zero before proceeding to Block 240. This assures that the calculation of Block 231 will be performed every $T_2$ seconds.

Block 240 monitors the priority update interval ($T_3$ seconds). Every $T_3$ seconds the priority of all active processes is calculated. Programs will run until their priority falls below that of a competing program; therefore the duration of $T_3$ is important. If $T_3$ is too short, the time devoted to overhead consumes an unacceptable portion of the overall processing time. If $T_3$ is too long, the computer no longer appears to be providing continuous service to all users. $T_3$ should be set to a value comparable to the desired responsiveness of the system.

Block 241 illustrates a particular manner of updating the recent processing rate (r). The formula used in this example is:

$$r_{ij}^{new} = K r_{ij}^{old} + (1 - K) \frac{S_{ij}}{T_3}$$

where $0 < K < 1$.

In the above equation, note that the value of K is less than unity. This has the effect of reducing the new value of r each time the indicated multiplication is carried out. Thus, when process j in account i is not running $S_{ij}=0$, and $r_{ij}$ will be decreased at a rate controlled by the value of K. We shall see in the discussion on priority that a decreasing value of r leads to an increasing value of priority. The processing rate is calculated every $T_3$ seconds for all active programs. The value of r is essentially an exponentially weighted measure of the actual processing rate. As $T_3 \to 0$ and as $K \to 1$ $$K \to 1 \left( \text{holding } \frac{1-K}{T_3} \text{ constant} \right)$$

r tracks the instantaneous processing rate. This method has the practical advantage that it is necessary to carry along only the current value of r.

Variables that enter into the calculation of priority (P) have all been computed and it only remains to perform the actual calculation. Block 242 illustrates a formula that links priority to both entitlement and recent processing rate:

$$P_{ij} = M - \frac{r_{ij}}{q_{ij}\rho}.$$

Figure 3:
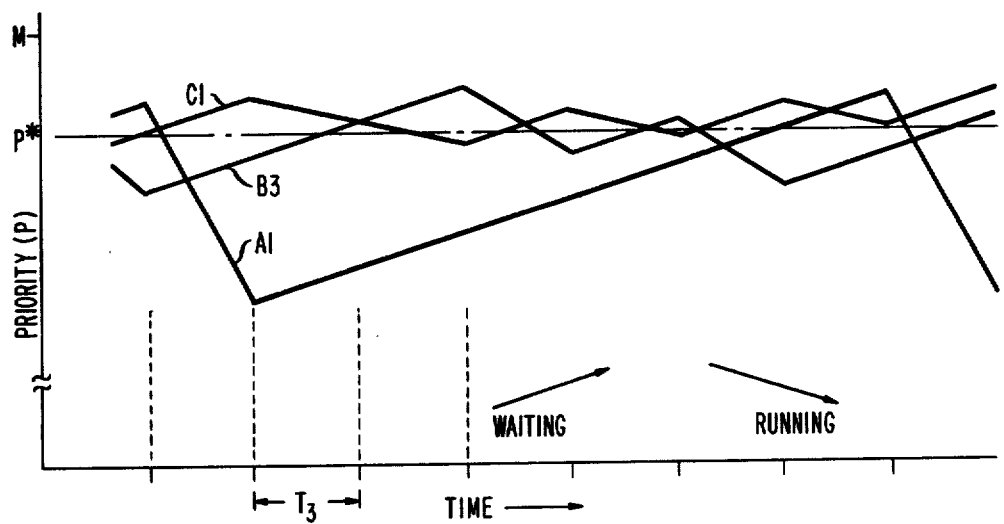
FIG. 3 graphically illustrates the time variation in priority in a system having three active processes.

Recall that M is the highest value of priority and $\rho$ is the scaling factor that keeps all values of priority within a predetermined operating range (0-M). As a practical matter, the individual values of priority will tend to cluster about some equilibrium value, say $P^*$. Programs that receive no processing time will all have their priorities uniformly increased with time. The rate at which priority decreases, however, is closely linked with the individual program entitlement. The increases and decreases in priority are graphically illustrated in FIG. 3. For the purpose of clarity, FIG. 3 shows priorities varying linearily with time (i.e., straight lines). A more correct rendering of the priority variations would show changes that are exponential with time.

The time values of priority for processes A1, B3 and C1 (all assumed to be active) are shown in FIG. 3. Recall from FIG. 1 that their relative entitlements were all different:

$q_{a1} = 1$PU
$q_{b3} = 4$PU's
$q_{c1} = 6.66$PU's

Thus, it is to be expected that process C1 will be running more frequently than the others since its entitlement is greater. It follows that upward or downward movement in priority for the various processes shown in FIG. 3 will be noticeably different. The exact nature of the priority adjustment scheme is a matter of design choice implemented by modifying the formula for priority. The more important feature of this illustrative embodiment resides in an ability to regulate access to computer resources by a priority scheme that is responsive to contractable entitlement and recent processing rate.

Block 243 indicates that the measure of consumed resource units $S_{ij}$ and the $t_3$ clock are set to zero. If, however, the process was completed before $t_3 = T_3$, then that process is removed from the list of active processes. Blocks 250 and 260 indicate the required decision steps. For the purpose of example we are assuming that process j in account i is the program being executed.

Because the system which provides the resources must occasionally perform certain high priority system tasks, it is not always able to provide an account with its contracted PU's. A compromise which allows the system to pre-empt user level work when necessary, yet still provides the user with a perception of a virtual machine, is to assure the user account of at least its contracted level, between 90 and 100 percent of the time. Thus, a user account is insulated from other user accounts but not necessarily from the system (as it clearly cannot be). System behavior is under system control and, so, can be made to be stable.

The actual execution rate of a program depends on its weight relative to other competing programs in the account and the number of PU's available to the account. Given the number of RU's the program consumes, the objective response time is given by:

$$\text{Objection response time} = \frac{\#RU's}{\frac{w_{ij}}{\sum_j w_{ij}} \cdot Q_i} \text{ seconds.}$$

The sum is over concurrently active programs within the account. Mathematically this is shown by summing over all active programs in account i. The actual response time is equal to the objective response time when the account receives exactly its contracted number of PU's. The quantities on the right side of the equation are all known or easily estimated. Thus, the user can quickly predict performance. This methodology contrasts sharply with the complex queuing analysis often required to predict delay in conventionally shared systems. The number of RU's consumed will be a function of the data used by the program, but an estimate of an often-used program can be found by executing it with a typical set of data. This is viewed as being the user's responsibility. In a practical implementation, there is a tradeoff between the accuracy of the algorithm and the overhead incurred in making schedule decisions.

The structure described here provides an environment in which the performance of a particular program can be predicted within a usefully narrow range. This satisfies the user objective of predictability.

Although a specific embodiment of this invention has been shown and described, it will be understood that various modifications may be made without departing from the spirit of the invention.

What is claimed is:

1. A method for time sharing the resources of a processing machine among a plurality of accounts, each account containing processes competing for access to said resources including the periodic use of specific hardware associated with the processing machine, comprising the machine performed steps of:

assigning a separate processing rate entitlement to each account in response to performance requirements selected by each separate user, said processing rate entitlement being a measure of entitlement to access the resources of said processing machine;

allocating a share of the processing rate entitlement to the various processes within each account;

measuring the time periods during which each specific hardware is used by each process;

multiplying said time periods during which specific hardware is used with weight factors associated with each specific hardware to determine the resources consumed by each process;

calculating a processing rate for each process by dividing the resources consumed by a predetermined time interval;

calculating a priority for each process by dividing the allocated processing rate entitlement by the processing rate; and executing the process having the highest priority.

2. The method of claim 1 wherein each process executes in a series of processing intervals, during one of said processing intervals one or more items of specific hardware are used, and after said one of said processing intervals priority is recalculated for each of the processes by repeating the steps of claim 1.

3. The method of claim 2 wherein the recalculation of processing rate further includes the step of multiplying the existing value of the calculated processing rate by a number less than unity.

4. In a system having at least one account, a method for scheduling processes for execution by a processing machine, each process being associated with an account and having an initial value of priority, each process utilizing one or more particular resources during execution, each account being assigned a processing rate entitlement in response to user selected performance requirements, and each process in the account being assigned a weight factor in response to user selected performance requirements, comprising the machine performed steps of:

apportioning the processing rate entitlement among the processes in each account in accordance with their assigned weight factors;

measuring the time interval during which a particular resource is used by each of said processes;

multiplying the time interval during which a particular resource is used and a separate numerical quantity associated with each particular resource to determine resource consumption for each process;

calculating a resource consumption rate for each process by dividing the resources consumed by a predetermined time interval;

dividing the apportioned processing rate entitlement by the resource consumption rate to determine a value of priority for each process; and executing the process having the highest priority.

5. The method of claim 4 wherein processes are executed in discrete processing intervals, the value of priority being recalculated for each of the processes after each processing interval by repeating the steps of claim 4.

6. The method of claim 5 wherein the recalculation of resource consumption rate further includes the step of: multiplying the magnitude of the previously calculated resource consumption rate by a number whose magnitude is less than unity.

7. The method of claim 4 further including the steps of:

calculating an average resource consumption rate as the summation of the individual resource consumption rates of all processes divided by the number of processes; and constraining the values of priority for the various processes to a predetermined range by multiplying the values of priority by a scaling factor, said scaling factor being proportional to the average resource consumption rate of said processes.

* * * * *